United States Patent Office 3,230,029
Patented Jan. 18, 1966

3,230,029
PROCESS FOR IMPROVING SYNTHETIC FIBERS AND THE DYEABLE FIBERS OBTAINED THEREBY
Vittorio Cappuccio and Paolo Maltese, Terni, Italy, assignors to Montecatini Società Generale per l'Industria Mineraria e Chimica, a corporation of Italy
No Drawing. Filed Feb. 13, 1959, Ser. No. 792,988
Claims priority, application Italy, Feb. 21, 1958, Patent 584,249
13 Claims. (Cl. 8—55)

This invention relates to methods for improving the dyeing characteristics of synthetic fibers. More particularly, the invention relates to a method for improving the dyeing properties of fibers formed from crystalline polymeric alpha-olefins or from olefin copolymers.

Natta et al. have disclosed the polymerization of alpha-olefins $CH_2=CHR$ where R is hydrocarbon with stereospecific catalysts, such as that prepared by mixing highly crystalline $TiCl_3$ with triethyl aluminum, directly to polymerizates consisting prevailingly of isotactic macromolecules and which are crystalline or crystallizable.

Natta et al. have also disclosed new olefinic copolymers containing, in the macromolecule, units derived from the alpha-olefins.

They have disclosed, further, that the new alpha-olefin homopolymers and copolymers have a variety of distinguishing characteristics and that various kinds of fibers can be obtained from them.

It is known that the fibers formed from the new homopolymers and/or copolymers are either not receptive to basic, acid and acetate type dyes, or have very poor receptivity for those dyes.

A number of applications have been filed by the present assignee disclosing different methods for improving the dyeing characteristics of articles, including fibers, formed from the new crystalline alpha-olefin homopolymers consisting prevailingly of isotactic macromolecules. Such macromolecules, as shown by Nata et al. (see, e.g., J.A.C.S., March 20, 1955) are characterized in that for at least long sections of the main chain, or for substantially the main chain, the asymmetric tertiary carbon atoms of successive monomeric units have the same steric configuration.

The primary object of this invention is to provide a new method for substantially improving the dyeability of fibers formed from the alpha-olefin homopolymers, mixtures thereof, or from the copolymers.

This and other objects are accomplished by the present invention based on our discovery that the fibers, e.g. fibers of crystalline polypropylene consisting prevailingly of isotactic macromolecules, can be rendered receptive to the basic and acetate type dyes by introducing sulfonic or chlorosulfonic groups into the polymer macromolecule, and our further discovery that the fibers comprising the polymer containing the sulfonic or chlorosulfonic groups can be rendered receptive to the acid type dyes by aftertreatment with an agent containing aminic nitrogen, e.g., a polyalkyleneimine.

According to the invention, therefore, fibers consisting at least predominantly of a crystalline alpha-olefin polymer are treated with sulfonation or chlorosulfonation agents to render the same readily dyeable with the basic or acetate dyes, and, optionally, if receptivity for the acid type dyes is desired, the sulfonated or chlorosulfonated fibers are treated with the aminating agent.

The fibers may consist exclusively of the crystalline alpha-olefin polymer, or of a mixture of such a polymer with another synthetic polymer or with a polymerizable ethylenically unsaturated monomer different from the alpha-olefins. Where the fibers comprise a mixture of the alpha-olefin polymer with another synthetic polymer, it is preferred to use fibers formed from a mixture comprising at least 75% of the crystalline alpha-olefin polymer and from 5% to 25% of either polystyrene or monomeric styrene. Where the fibers comprise a mixture of the crystalline alpha-olefin and a polymerizable monomer, it is preferred to use fibers formed from a mixture of about 90% of the crystalline alpha-olefin polymer and from 5% to 10% of monomeric styrene.

For example, excellent results have been obtained with fibers produced by extruding a melt comprising such mixtures of the crystalline polypropylene with monomeric or polymeric styrene.

The sulfonation and chlorosulfonation agents which can be used in practicing this invention include sulfuryl chloride, chlorosulfonic acid, conc. sulfuric acid, oleum, gaseous mixtures of sulfur dioxide and chlorine, etc.

The sulfonation or chlorosulfonation can be carried out by immersing staple fibers, continuous filaments, or yarns, comprising the crystalline alpha-olefin polymer in a bath prepared from $SO_2Cl_2$, $H_2SO_4$, chlorosulfonic acid, oleum, or the like, at room temperature and for a period of time which can be varied depending on the specific sulfonation or chlorosulfonation agent employed.

After the fibers are removed from the bath, they are treated to eliminate the sulfonating agent adhering to them. The fibers can be washed carefully and then saponified with supercooled liquids such as acetone and water, chloroform and ether, nitromethane and carbon tetrachloride, in order to eliminate residual traces of the sulfonating and chlorosulfonating agents.

The values for the electrostatic, permeability and serimetric characteristics of the sulfonated and chlorosulfonated fibers have been determined and found to compare favorably with those of the fibers prior to sulfonation or chlorosulfonation. These values are given in Table I below.

The following examples are given to illustrate the invention, it being understood that the examples are not intended as limiting.

*Example 1*

Staple fibers of crystalline polypropylene consisting prevailingly of isotactic macromolecules and having intrinsic viscosity $[\eta]=1$ are placed for 20 minutes in a $SO_2Cl_2$ bath at room temperature. The staple fibers are then removed from the bath and subjected to abundant washing with petroleum ether, acetone and water to eliminate completely the chlorosulfonating agent. After the treatment, the staple fibers contain 1.14% Cl and 0.34% S as shown in Table I.

The staple fibers are then dyed with the basic malachite-green dye at the following weight ratios: fiber-bath 1:30, dye-fiber 2:100. The dyeing is carried out at the boiling point for 1 hour in the presence of 1% acetic acid. The dyed staple fibers are then washed in a detergent solution containing 2% ethylene oxide-ricinoleic acid condensate and 2% acetic acid, this operation being carried out for 15 minutes at 60° C. while the fiber bath ratio is kept equal to 1:30.

Table I

| Fiber polymer | Sulphonating or chlorosulphonating agent | Conditions of reaction | | Other treatments | | Treatment | Resistivity, ohm/cm. | Tenacity, gr./d. | Elongation, percent | $Cl_2$ | S, percent | N, percent |
|---|---|---|---|---|---|---|---|---|---|---|---|---|
| | | Time, min. | Temp., °C. | Time, min. | Temp., °C. | | | | | | | |
| Polypropylene ($\eta$)=1. | None | | | | | | | | | | | |
| | $SO_2Cl_2$ | 120 | Room | | | | $7.69 \cdot 10^8$ | 3.21 | 32.4 | | | |
| | $SO_2Cl_2$ | 20 | do | | | | $12.7 \cdot 10^8$ | 3.16 | 34 | | | |
| | | | | | | | | 2.38 | 15 | 1.14 | 0.34 | |
| Polypropylene ($\eta$)=1.19 +10% styrene. | None | | | | | | $3.33 \cdot 10^8$ | 2.91 | 21.4 | | | |
| | $SOCl_2$ | 3 | Room | | | | $3.93 \cdot 10^8$ | 3.20 | 25 | | | |
| | $SO_2Cl_2$ | 3 | do | | | | $5.6 \cdot 10^8$ | 2.97 | 38 | Traces | 0.09 | 0.18 |
| | $H_2SO_4$ (Cl=1.84) | 60 | 100 | 30 | 100 | Aqueous polyethyleneimine solution at 25%. | | 2.3 | 20 | | | |
| | $SO_2 \diagdown OH \diagup Cl$ | 4 | Room | | | | | 2.0 | 31.0 | 0.34 | 0.44 | |
| Polypropylene ($\eta$)=1.16 +10% polystyrene. | $SO_2$ and $Cl_2$ | ¹15 | do | | | | | 4.0 | 23 | | 0.19 | |
| | Oleum ($SO_3$%=20) | 10 | do | | | | | 2.3 | 24 | | 0.56 | |
| | None | | | | | Aqueous polyethyleneimine solution at 25%. | $7.2 \cdot 10^8$ | 3.2 | 6.2 | | 0.34 | |
| | $SO_2Cl_2$ | 3 | Room | | | | $\infty \cdot 10^{12}$ | 2.78 | 36 | 1.02 | 0.34 | |
| | $SO_2Cl_2$ | 3 | do | 30 | 100 | | $4.10^6$ | 3.01 | 46.6 | 0.27 | 0.36 | 0.33 |

¹ Hours.

The staple fibers have good dyeability and accept basic dyes satisfactorily even if subjected to chlorosulfonation with $SO_2Cl_2$ for one minute only.

The serimetrical characteristics of the staple fibers prior and after treatment with $SO_2Cl_2$ are shown below:

| | Prior to treatment | After treatment |
|---|---|---|
| Tenacity, g./den | 3.21 | 2.38 |
| Elongation, percent | 32.4 | 15 |

*Example 2*

Yarn obtained from a mixture of 90% of the crystalline polypropylene having an intrinsic viscosity of 1.16 and 10% of polystyrene are immersed at room temperature for 3 minutes in an $SO_2Cl_2$ bath. The chlorine and sulfur contents of the yarn after the treatment are Cl=1.2% and S=0.42%. Extraction, washing and dyeing of the yarn is then carried out as in Example 1.

The yarn, which is perfectly white and of transparent appearance, is dyed with the following dyes:

Deorlin yellow _____ 5 GL.
Astrazon blue _____ G.
Methyl violet _____ N.
Malachite-green _____ XX.
Cibacet violet _____ RB.

The variations in the serimetrical characteristics of the yarn following the chlorosulfonation are shown below:

| | Prior to treatment | After treatment |
|---|---|---|
| Tenacity, g./den | 3.36 | 2.78 |
| Elongation, percent | 25.8 | 36.4 |

*Example 3*

Staple fibers obtained by extruding a mixture of the crystalline polypropylene (intrinsic viscosity 1.19) with 10% monomeric styrene and disrupting the extruded continuous filaments, are immersed in concentrated $H_2SO_4$ (d=1.84) for 1 hour at 100° C. After the staple has been taken out of the acid, it is first washed in cooled acetone and then in water to eliminate all of the acid present. The percentage of sulfur after the treatment is 0.49%. The staple is then dyed as in Example I.

Brilliant and solid colors are obtained with the following dyes:

Malachite green.
Astrazon red _____ 6B.
Astrazon blue _____ G.
Methyl violet _____ N, The serimetric characteristics of the staple vary according to the following values:

| | Prior to treatment | After treatment |
|---|---|---|
| Tenacity, g./den | 4.5 | 2.3 |
| Elongation, percent | 21.4 | 20 |

*Example 4*

Yarn obtained from a mixture of the crystalline polypropylene (intrinsic viscosity=1.16) with 10% polystyrene, are immersed for 3 minutes at room temperature in an $SO_2Cl_2$ bath.

The yarns are taken out of the bath, washed as in Example 1 and immersed in an aqueous 25% solution of polyethyleneimine which is kept at the boiling point for ½ hour.

After treatment with the polyimine the percentage of Cl, S and N, respectively, present in the yarn are: 1.35%, 0.5%, 0.25%.

The yarns are then washed abundantly with water and dyed with the following acid wool dyes:

Alizarine blue _____ ACF.
Solid red _____ A.
Solid gold yellow _____ 3GS.

After treatment with $SO_2Cl_2$ and the polyimine, the serimetric characteristics of the yarn vary in the following manner:

| | Prior to treatment | After treatment |
|---|---|---|
| Tenacity, g./den | 2.78 | 3.01 |
| Elongation, percent | 36.4 | 46.6 |

*Example 5*

A yarn obtained from a mixture of the crystalline polypropylene (intrinsic viscosity=1.19) and 10% of polystyrene is immersed for 4 minutes in chlorosulfonic acid and then washed in $CCl_4$ and ether.

After the treatment, the percentages of Cl and S, respectively in the yarn are: 1.21% and 0.35%.

The yarn is then treated with the following dyes:

Astrazon red.
Deorlin yellow.
Methyl violet.
Malachite green—XX

The serimetric characteristics of the yarn prior to and after the chlorosulfonation, are as follows:

|  | Prior to treatment | After treatment |
| --- | --- | --- |
| Tenacity, g./den | 2.91 | 1.19 |
| Elongation, percent | 29.2 | 14.5 |

*Example 6*

A yarn obtained by extrusion of a mixture of the crystalline polypropylene (intrinsic viscosity=1.13) with 10% of monomeric styrene, is treated for 15 hours at room temperature (16°-18" C.) with a gaseous mixture of $SO_2$ and $Cl_2$.

After the yarn has been washed as in Example 1, it is dyed with the basic dyes, after which it is found to contain 1.01% Cl and 0.6% S.

The serimetric characteristics of the yarn are as follows—

|  | Prior to treatment | After treatment |
| --- | --- | --- |
| Tenacity, g./den | 2.41 | 2.76 |
| Elongation, percent | 29.2 | 24.3 |

*Example 7*

A staple yarn obtained by extruding a mixture of the polypropylene (intrinsic viscosity=1) with 10% of monomeric styrene, is treated for 10 minutes at room temperature with oleum (percent $SO_3$=20).

The staple yarn is removed from the reaction mixture and washed as in Example 1. It is then dyed with malachite green. The percentage of S after the treatment, is 0.3.

The serimetric characteristics of the yarn prior to and after treatment, are shown below:

|  | Prior to treatment | After treatment |
| --- | --- | --- |
| Tenacity, g./den | 4.5 | 2.3 |
| Elongation, percent | 21.4 | 24 |

*Example 8*

A yarn obtained by extruding a melted mass consisting of a crystalline polypropylene (intrinsic viscosity=1) and monomeric styrene mixture in a ratio of 9:1, is immersed in phosphosulfuric acid in which it is kept for 1 hour at 80° C. The yarn after washing in cooled acetone and then in water as described in Example 1 has a percentage of 0.25 S and is dyeable with basic dyes.

The serimetric characteristics of the yarn prior to and after the treatment are set forth below:

|  | Prior to treatment | After treatment |
| --- | --- | --- |
| Tenacity, g./den | 4.5 | 2.4 |
| Elongation, percent | 21.4 | 25.0 |

The following yarns were also sulfonated in accordance with this invention:

Unstretched polypropylene yarns
Stretched polypropylene yarns
"Sullan" type yarns (bulky yarns as described in the application of Maragliano et al. (assigned to the same assignee) Ser. No. 727,398, filed April 9, 1958, now U.S. Pat. No. 3,019,507 and obtained by stretching yarn formed from smooth continuous filaments of, e.g., polypropylene consisting prevailingly of isotactic macromolecules at the highest rate of stretching which the filaments will withstand without breaking, to introduce irregularly distributed internal strains into the filaments, and then rapidly heating the stretched yarn at between 50° C. and the melting point of the polypropylene without the application of tension to the yarn during said heating).

"Sullan" yarns obtained from blends of 95% polypropylene with 5% epoxy resin
Stretched and unstretched yarns of blends of 90% polypropylene with 10% polystyrene The following yarns were sulfonated by means of hot sulfuric acid:

Unstretched polypropylene yarns
"Sullan" type yarns
Yarns from mixtures of the polypropylene and polystyrene Yarns were sulfonated by treatment with oleum at room temperature, as follows:

Stretched polypropylene yarns
Yarns formed from mixtures of the crystalline polypropylene with polystyrene The sulfonation was carried out with:

Sulfuric acid at 110–120° C. for times varying between a few seconds and two hours;
Oleum at room temperature for times varying from a few seconds to 10 minutes.

The sulfonation treatment was followed by washing with water.

The highest proportion of sulfur introduced into the fibers was 0.3%.

The sulfonation results in fibers which can be deeply dyed with basic dyes.

Tests on fibers dyed with, e.g., the basic dye "blue meldola" showed that the color has very good fastness to light (5–6).

The variations on the serimetrical characteristics of the stretched yarn resulting from variations in the sulfonation time are shown in Table II below. Table III shows the serimetrical characteristics of unstretched yarns after sulfonation thereof by means of sulfuric acid.

The sulfonated yarns have a certain elasticity, as is evident from Table IV, which compares the characteristics of non-sulfonated yarns with those of yarns sulfonated to different degrees.

Yarns as shown below were aminated after the sulfonation treatment:

Unstretched polypropylene yarn which had been treated with $H_2SO_4$;
Stretched polypropylene yarn, sulfonated by means of oleum;
"Sullan" type polypropylene yarn sulfonated with $H_2SO_4$;
"Sullan" type yarn formed from mixtures of 95% polypropylene and 5% epoxy resin, sulfonated with $H_2SO_4$;
Stretched and unstretched yarns formed from mixtures of 90% polypropylene and 10% polystyrene, sulfonated with oleum and $H_2SO_4$.

For the most part, ethyleneimine was used as the aminating agent, but the following amines were also used:

Ethylene diamine
Tetraethylene pentamine
Triethyl tetramine
Diethylene triamine
Polyethyleneimine The amination was carried out with ethyleneimine in aqueous solution at 90–95° C. for times varying between 20 minutes and 2 hours. The amination was followed by a washing operation.

Analysis of the yarns showed that, by amination with, e.g., ethyleneimine, about 10 ethyleneimine units are introduced into the sulfonated fibers per each sulfonic group present therein. This indicates that the fibers comprise branches on the polypropylene chains resulting from the radicalic polymerization of the ethyleneimine for which polymerization the sulfonic group functions as a catalyst.

Using the other imines listed, the amination was carried out in either alcohol or aqueous solution, under reflux, and for times varying between 1 and 5 hours.

The sulfonated fibers which were aminated could be dyed successfully to deep full colors with acid dyes.

The variations in the serimetrical characteristics of the fibers which were treated with the amine after sulfonation thereof are shown in Table V.

TABLE II

| Treatments | Tenacity, g./den. | Elongation, percent |
|---|---|---|
| Non-sulfonated stretched yarns | 4.64 | 18 |
| Yarns sulfonated with oleum for 1 min | 6.64 | 18.2 |
| Yarns sulfonated with oleum for 5 min | 6.05 | 16.8 |
| Yarns sulfonated with oleum for 10 min | 5.52 | 13 |
| Yarns sulfonated with oleum for 15 min | 4.9 | 10.6 |
| Yarns sulfonated with oleum for 20 min | 4.42 | 9 |

TABLE III

Variations in the serimetrical characteristics of unstretched yarns by varying the sulfonation time.

| Treatment with $H_2SO_4$ | Tenacity, g./den. | Elongation, percent | Elastic modulus, g./den. |
|---|---|---|---|
| 5 min at 120° C | 0.78 | 412 | 41.8 |
| 60 min at 120° C | 0.77 | 207 | 39.9 |
|  | 0.915 | 694 | 35 |

TABLE IV

Elastic characteristics of yarns having various degrees of sulfonation.

|  | Total elongation, percent | Instantaneous recovery, percent | Permanent elongation, percent |
|---|---|---|---|
| Yarn sulfonated for 5 minutes | 5 | 47.4 | 0 |
|  | 10 | 32.3 | 0.6 |
|  | 25 | 22.1 | 3.3 |
|  | 50 | 15.4 | 4.5 |
|  | 100 | 9.8 | 5.3 |
|  | 200 | 6.5 | 20.8 |
| Yarn sulfonated for 60 minutes | 5 | 48 | 0 |
|  | 10 | 35.7 | 2.5 |
|  | 25 | 23.2 | 1.9 |
|  | 50 | 14.5 | 2.7 |
|  | 100 | 11.9 | 3.1 |
| Not sulfonated yarn | 5 | 44.6 | 0 |
|  | 10 | 26.6 | 14 |
|  | 25 | 13.8 | 20.8 |
|  | 50 | 9 | 26.2 |
|  | 75 | 9.6 | 24.5 |
|  | 100 | 7.4 | 33.7 |
|  | 200 | 5.5 | 59.5 |
|  | 400 | 3.3 | 78.3 |

TABLE V

Variations in the serimetrical characteristics of stretched polypropylene yarns, sulfonated and then aminated.

|  | Tenacity, g./den. | Elongation, percent |
|---|---|---|
| 1 minute in oleum, followed by amination | 5.8 | 18 |
| 5 minutes in oleum, followed by amination | 4.9 | 14.4 |
| 10 minutes in oleum, followed by amination | 4.65 | 13.8 |
| 15 minutes in oleum, followed by amination | 2.88 | 9.4 |
| 20 minutes in oleum, followed by amination | 2.7 | 7.4 |

The fibers treated according to the present method are formed from crystalline polymeric alpha-olefins $$CH_2=CHR$$

where R is hydrocarbon, according to Natta et al. and which consist prevailingly of the isotactic macromolecules.

Prior to being formed into the fibers, the crystalline alpha-olefin polymer can be mixed with 5% to 25%, preferably 5% to 10% by weight, of another high polymer which is compatible with it, or with a compatible polymerizable monomer. Styrene or polymers of styrene having any molecular weight can be used, as well as any of the epoxy resins. Usually, the epoxy resin used is a condensation product of epichlorhydrin and bis-phenol.

The foregoing examples clearly demonstrate the improved receptivity for the basic and acetate dyes of the fibers comprising the crystalline polymeric alpha-olefins containing sulfonic and chlorosulfonic groups substituted in the polymer macromolecule, as well as the improved receptivity for the acid dyes resulting from after-treatment of the sulfonated fibers with the substances containing aminic nitrogen. It will be apparent that changes can be made in details, in practicing the invention, without departing from the spirit thereof, and therefore we intend to include in the scope of the appended claims all such variations and modifications as may be apparent to those skilled in the art from the description and specific examples given herein.

What is claimed is:

1. Fibers consisting essentially of a fiber-forming material selected from the group consisting of crystalline polyproylene made up prevailingly of isotactic macromolecules, and blends of said polypropylene with from 5% to 25% by weight of polystyrene, the polypropylene having substituted therein at least one of the groups selected from sulfonic and chlorosulfonic groups in a proportion such that the total amount of combined sulfur is from about 0.3% to about 0.5% by weight and the total combined chlorine, if any, is from about 0.27% to about 1.35%, the fibers being dyed with a basic dye.

2. Fibers according to claim 1, characterized in that the fiber-forming material is the crystalline polypropylene made up prevailingly of isotactic macromolecules.

3. Fibers according to claim 1, characterized in that the fiber-forming material is the blend of the crystalline polypropylene made up prevailingly of isotactic macromolecules and polystyrene.

4. Fibers consisting essentially of a fiber-forming material selected from the group consisting of crystalling polypropylene made up prevailingly of isotactic macromolecules, and blends of said polypropylene with from 5% to 25% by weight of polystyrene, the polypropylene having substituted therein at least one of the groups selected from sulfonic and chlorosulfonic groups in a proportion such that the total amount of combined sulfur is from about 0.3% to about 0.5% by weight and the total combined chlorine, if any, is from about 0.27% to about 1.35%, the fibers being dyed with an acetate dye.

5. Fibers according to claim 4, characterized in that the fiber-forming material is the crystalline polypropylene made up prevailingly of isotactic macromolecules.

6. Fibers according to claim 4, characterized in that the fiber-forming material is the blend of the crystalline polypropylene made up prevailingly of isotactic macromolecules, and polystyrene.

7. Fibers consisting essentially of a fiber-forming material selected from the group consisting of crystalline polypropylene made up prevailingly of isotactic macromolecules, and blends of said polypropylene with from 5% to 25% by weight of polystyrene, the polypropylene having substituted therein at least one of the groups selected from sulfonic and chlorosulfonic groups in a proportion such that the total amount of combined sulfur is from about 0.3% to about 0.5% and the total combined chlorine, if any, is from about 0.27% to about 1.35%, the fibers comprising the sulfonated, respectively chlorosulfonated polypropylene, being aminated and dyed with an acid dyestuff.

8. Fibers according to claim 7, characterized in that the fiber-forming material is the crystalline polypropylene made up prevailingly of isotactic polypropylene.

9. Fibers according to claim 7 and further characterized in that the fiber-forming material is the crystalline polypropylene made up prevailingly of isotactic macromolecules.

10. Fibers according to claim 7 and further characterized in that the fiber-forming material is the blend of the crystalline polypropylene made up prevailingly of isotactic macromolecules, and polystyrene.

11. Fibers consisting essentially of a fiber-forming material selected from the group consisting of crystalline polypropylene made up prevailingly of isotactic macromolecules, and blends of said polypropylene with from 5% to 25% by weight of polystyrene, the polypropylene having substituted therein at least one of the groups selected from sulfonic and chlorosulfonic groups in a proportion such that the total amount of combined sulfur is from about 0.3% to about 0.5% by weight and the total combined chlorine, if any, is from about 0.27% to about 1.35% said fibers comprising the sulfonated, respectively chlorosulfonated, polypropylene being receptive to basic and acetate dyes.

12. Fibers according to claim 11, characterized in that the fiber-forming material is the crystalline polypropylene made up prevailingly of isotactic macromolecules.

13. Fibers according to claim 11, characterized in that the fiber-forming material is a blend of the crystalline polypropylene made up prevailingly of isotactic macromolecules, and polystyrene.

References Cited by the Examiner
UNITED STATES PATENTS

| | | |
|---|---|---|
| 2,832,699 | 4/1958 | Walles. |
| 2,886,471 | 5/1959 | Bruce. |
| 2,879,177 | 3/1959 | Nelson. |
| 2,937,066 | 5/1960 | Walles. |
| 2,973,241 | 2/1961 | Scott. |
| 3,022,276 | 2/1962 | Orthner et al. _____ 260—79.3 |
| 3,050,503 | 8/1962 | Natta _____ 260—79.3 |

FOREIGN PATENTS

| | | |
|---|---|---|
| 152,926 | 8/1953 | Australia. |
| 540,362 | 2/1956 | Belgium. |
| 593,036 | 10/1947 | Great Britain. |

NORMAN G. TORCHIN, *Primary Examiner.*

WILLIAM B. KNIGHT, MORRIS O. WOLK,
*Examiners.*